(12) United States Patent
Lau et al.

(10) Patent No.: US 9,936,552 B1
(45) Date of Patent: Apr. 3, 2018

(54) SYSTEM HAVING A DRIVER WITH VOLTAGE SUPPLY USING AN AUXILIARY WINDING OF A TRANSFORMER

(71) Applicant: Infineon Technologies Austria AG, Villach (AT)

(72) Inventors: Tiam Poh Lau, Singapore (SG); Marcus Schaemann, Munich (DE)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 15/427,811

(22) Filed: Feb. 8, 2017

(51) Int. Cl.
  *H05B 37/02* (2006.01)
  *H05B 33/08* (2006.01)
  *H02M 3/335* (2006.01)

(52) U.S. Cl.
  CPC .... *H05B 33/0845* (2013.01); *H02M 3/33523* (2013.01); *H05B 33/0815* (2013.01); *H05B 37/0272* (2013.01); *H05B 33/0839* (2013.01)

(58) Field of Classification Search
  CPC .................................................. H05B 33/0839
  USPC ................................ 315/219, 291, 307, 308
  See application file for complete search history.

(56) References Cited

U.S. PATENT DOCUMENTS 8,044,600 B2 * 10/2011 Yan ................... H05B 33/0815
  315/219
8,514,594 B2 * 8/2013 Wu ................... H02M 3/33507
  363/21.12
2012/0248998 A1 * 10/2012 Yoshinaga ......... H05B 33/0815
  315/193
2012/0319610 A1 * 12/2012 Yoshinaga ......... H05B 33/0848
  315/210

OTHER PUBLICATIONS

"AC/DC Advanced Digital Power Controller for Phase-Cut Compatible I2C Digital Dimming LED Drivers," Dialog Semiconductor, iW3690, www.dialog-semiconductor.com, Rev. 1.2, Jun. 2, 2016, 7 pp.

* cited by examiner

*Primary Examiner* — Thuy Vinh Tran
(74) *Attorney, Agent, or Firm* — Shumaker & Sieffert, P.A.

(57) ABSTRACT

In one example, a system includes a controller, a transformer including at least a primary winding and an auxiliary winding, a voltage supply, and a driver. The controller is configured to output an indication of a target current or a target power. The voltage supply is configured to receive an electrical current having a constant average current over time from the auxiliary winding and to output variable electrical current for supplying the controller. The voltage supply includes a capacitor for storing energy and a current sink for consuming a current. The driver is configured to selectively energize the primary winding for supplying one or more load devices based on the target current or the target power and selectively energize the primary winding for operating the voltage supply based on an indication of a voltage at the voltage supply.

20 Claims, 8 Drawing Sheets

SYSTEM HAVING A DRIVER WITH VOLTAGE SUPPLY USING AN AUXILIARY WINDING OF A TRANSFORMER

TECHNICAL FIELD

This disclosure relates a driver, such as a light emitting diode (LED) driver, that is configured to control a current or power supplied to a load device, such as a string of LEDs.

BACKGROUND

Drivers may control a current or power at a load device. For instance, a light emitting diode (LED) driver may control a current or power supplied to a string of LEDs. Some drivers may include an alternating current (AC) or direct current (DC) to DC converter, such as a flyback, a buck-boost, buck, boost, or another DC to DC converter. Such AC to DC and DC to DC converters output a desired current or power at the load device. For instance, when operating a street lamp for projecting light in a high beam mode when pedestrians are present, the string of LEDs may operate at a higher current or power than when operating in a low beam mode when no pedestrians are present.

SUMMARY

In general, this disclosure is directed to techniques for a driver that permits a voltage supply using an auxiliary winding of a transformer in parallel to providing the output current or power to the load. For example, a driver energizes a primary winding of a transformer to charge a magnetic field of the transformer, which causes a secondary winding of the transformer to output a desired current or power at a load device, such as a light emitting diode (LED). The transformer may provide electrical isolation between the primary and secondary sides of the transformer for improved safety. In this example, the driver may control the current or power output at the secondary. Rather than using a separate transformer or non-isolated topology, one or more techniques described herein permit a voltage supply that uses the auxiliary winding to power various devices, such as the driver itself, a controller for controlling the driver, and other devices.

In an example, a system includes a transformer, a controller, a voltage supply, and a driver. The transformer includes at least a primary winding and an auxiliary winding. The controller is configured to output an indication of a target current or a target power to the driver. The voltage supply is configured to receive an electrical current having a constant average current over time from the auxiliary winding and to output variable electrical current for supplying the controller. The voltage supply includes a capacitor for storing energy and a current sink for consuming a current. The driver is configured to selectively energize the primary winding for supplying one or more load devices based on the target current or the target power and selectively energize the primary winding for operating the voltage supply based on an indication of a voltage at the voltage supply.

In another example, a driver is configured to receive, from a controller, an indication of a target current or a target power. The driver is further configured to selectively energize a primary winding of a transformer for supplying one or more load devices based on the target current or the target power and selectively energize the primary winding for operating a voltage supply based on an indication of a voltage at the voltage supply. The voltage supply is configured to receive an electrical current having a constant average current over time from an auxiliary winding of the transformer and to output variable electrical current for supplying the controller. The voltage supply includes a capacitor for storing energy and a current sink for consuming a current.

In another example, a system includes a transformer, a switch, a controller, a driver, and a voltage supply. The transformer includes at least a primary winding and an auxiliary winding. The switch, when activated, establishes a conductive path connecting a rectified voltage and the primary winding of the transformer. The controller is configured to output an indication of a target current or a target power for one or more load devices. The voltage supply is configured to receive an electrical current having a constant average current over time from the auxiliary winding and to output variable electrical current for supplying the controller. The voltage supply including a capacitor for storing energy and a current sink for consuming a current. The driver is configured to selectively activate the switch to energize the primary winding for supplying the one or more load devices and selectively activate the switch to energize the primary winding for operating the voltage supply based on an indication of a voltage at the voltage supply.

Details of these and other examples are set forth in the accompanying drawings and the description below. Other features, objects, and advantages will be apparent from the description and drawings, and from the claims.

DETAILED DESCRIPTION

Some systems may use an alternating current (AC) or direct current (DC) to DC power converter to control a voltage output to a load device, such as a light emitting diode (LED). In some applications, an isolated AC to DC or DC to DC converter, for instance, a flyback converter, is used to improve a safety of a resulting device. To provide the electrical isolation, a flyback converter uses separate windings of a transformer. For instance, a flyback converter may selectively energize a primary winding of the transformer to control a current or voltage output at a secondary winding of the transformer. Rather than directly measuring a current or voltage output at the secondary winding of the transformer, drivers may be configured to estimate a current or voltage output at the secondary winding using information on the primary side, for instance an auxiliary winding or the current through the primary winding. For instance, a driver may determine a voltage output at the secondary winding according to a voltage at the secondary winding as modified by a winding ratio between the secondary and auxiliary windings.

In an effort to reduce a complexity and cost, some systems provide power to devices such as a driver and a controller using the auxiliary winding of the transformer. For instance, rather than providing a primary AC to DC or DC to DC converter for operating a load device and a separate standby or auxiliary power supply to power the primary AC to DC or DC to DC converter, a single self-supply AC to DC or DC to DC converter is used with a primary side regulation. However, a self-supply AC to DC or DC to DC converter may be unable to provide sufficient power to devices when the load device is off or infrequently operated. For example, during a light-off operation of an LED, the self-supply AC to DC or DC to DC converter may not provide sufficient power to the transformer to power the devices operating at the self-supply AC to DC or DC to DC converter. In some devices, for instance, a wireless controller, such light-off operations of the LED may cause the wireless controller to lose communication with a remote device, which may result in a failure of the wireless controller to respond to the remote device. Further, a self-supply AC to DC or DC to DC converter may introduce an output current offset that depends on a current consumption of devices operating at the self-supply AC to DC or DC to DC converter. For instance, a variable amount of current consumed by a microcontroller operating at the self-supply AC to DC or DC to DC converter may introduce a corresponding output current offset at the load device. In some applications, for instance, dimmable LEDs, such a current offset may cause an undesirable flickering at the dimmable LEDs.

In accordance with one or more techniques described herein, a driver may be configured to selectively energize a primary winding for operating a voltage supply. For example, rather than energizing a primary winding to only activate a load device at a secondary winding, the driver may energize the primary winding for operating a voltage supply at an auxiliary winding. For instance, a driver may energize the primary winding when a voltage at the auxiliary winding is less than a threshold for operating a wireless controller powered by the voltage supply without activating the load device at the secondary winding. In this way, the driver may ensure that devices are supplied sufficient power from the auxiliary winding, even during light operations. Further, the voltage supply may be configured to receive a constant current from the auxiliary winding and output variable electrical current to one or more devices. In this way, the driver may ensure accurate control of a current output at the secondary winding to the load device, even when the voltage supply powers devices that use a variable amount of current.

Figure 1:
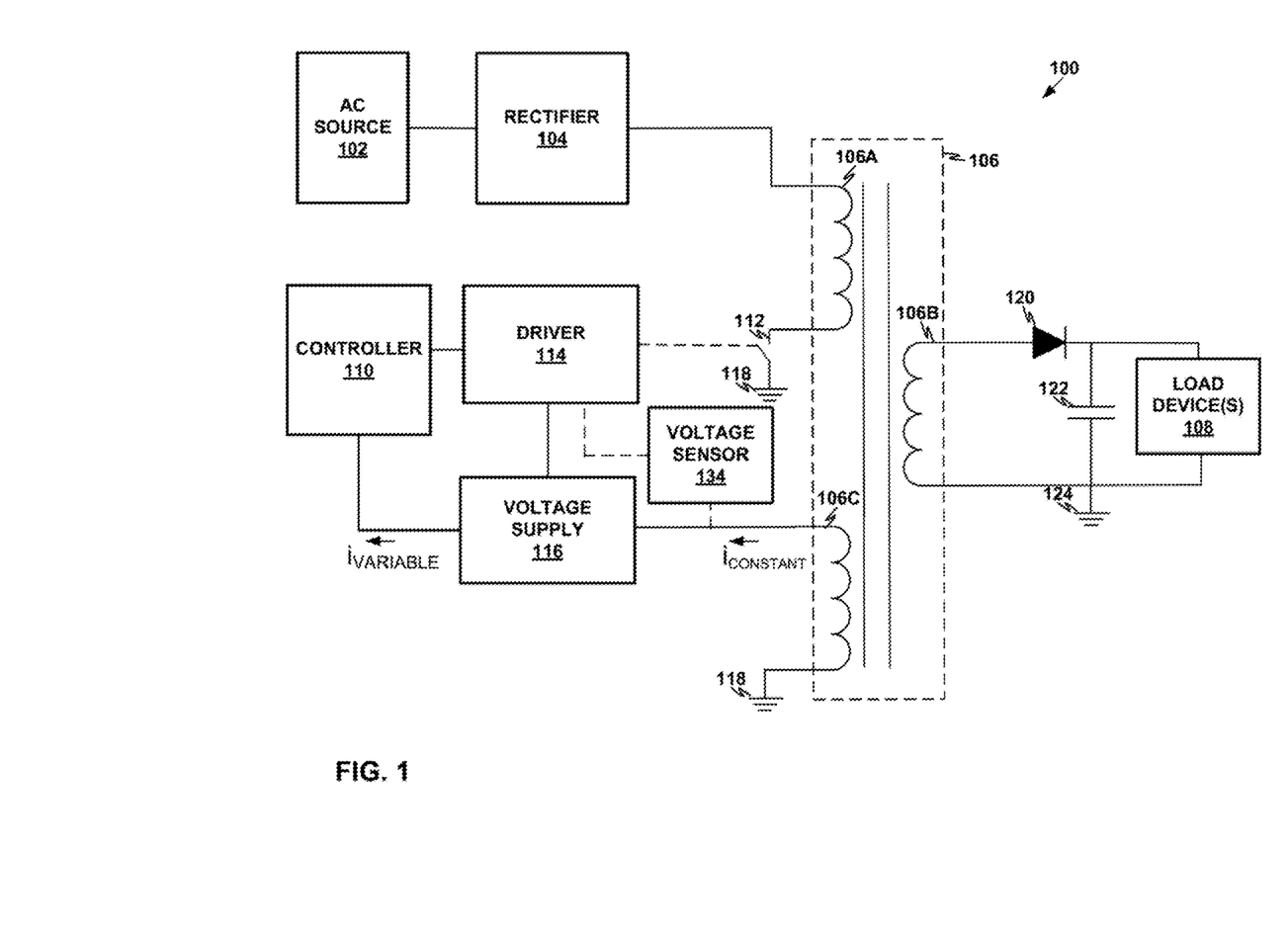
FIG. 1 is a block diagram illustrating an exemplary system for voltage supply using an auxiliary winding, in accordance with one or more techniques of this disclosure.

FIG. 1 is a block diagram illustrating an exemplary system 100 for voltage supply using an auxiliary winding in parallel to providing the output current or power to the load, in accordance with one or more techniques of this disclosure. As illustrated in the example of FIG. 1, system 100 may include alternating current (AC) source 102, rectifier 104, primary winding 106A, secondary winding 106B, and auxiliary winding 106C (collectively, transformer 106), one or more load devices 108, controller 110, switch 112, driver 114, voltage supply 116, first ground 118, diode 120, capacitor 122, second ground 124, and voltage sensor 134. It should be understood that although first ground 118 or second ground 124 may, in some examples, refer to an earth ground or ground plane, in some examples, first ground 118 may refer to a first reference point of system 100 that is different than an earth ground or ground plane and second ground 124 may refer to a second reference point of system 100 that is different than an earth ground or ground plane.

AC source 102 may be an output from any suitable electrical grid. For example, the output may be ~120 $V_{AC}$ at ~60 Hz, ~230 $V_{AC}$ at ~50 Hz, or another voltage and frequency. In some examples, AC source 102 may be configured to supply a voltage in a first direction during a first half of a cycle and supply voltage in a second direction during a second half of the cycle, the first direction being opposite from the second direction. For instance, AC source 102 may be configured to supply a sine wave that includes a positive current (e.g., first direction) flowing from a first node of AC source 102 to a second node of AC source 102 during a first half (e.g., 0 to $\pi$) of a cycle of the sine wave and a negative current (e.g., second direction) flowing from the second node of AC source 102 to the first node of AC source 102 during a second half (e.g., $\pi$ to $2\pi$) of the cycle of the sine wave.

Rectifier 104 may be configured to receive an AC voltage from AC source 102 and to provide a rectified AC voltage to one or more other components of system 100. For example, rectifier 104 may be configured to supply electrical power to energize primary winding 106A. Examples of rectifier 104 may include, but are not limited to, single-phase rectifier (e.g., bridge, half wave, full wave, or another single-phase rectifier), three-phase rectifier (e.g., half wave, full wave, bridge, or another three-phase rectifier), or another device configured to supply electrical power to energize primary winding 106A.

Transformer 106 may be selected to have a suitable turns ratio between auxiliary winding 106C to secondary winding 106B. For example, a designer may select transformer 106 such that a turns ratio of auxiliary winding 106C to secondary winding 106B does not reach a minimum turn-on threshold of one or more load devices 108 by a certain margin.

One or more load devices 108 may be configured to receive a current or power from secondary winding 106B. For example, one or more load devices 108 may include LEDs. LEDs may refer to any suitable semiconductor light source. In some examples, LEDs may be dimmable. For instance, a light intensity output by an LED may reduce as an average power received at the LED is reduced and a light intensity output by an LED may increase as an average power received at the LED is increased. In some examples, an LED may include a p-n junction configured to emit light when activated. In an exemplary application, one or more load devices 108 may be included in a headlight assembly for automotive applications. For instance, one or more load devices 108 may be a matrix of light emitting diodes to light a road ahead of a vehicle. As used herein, a vehicle may refer to motorcycles, trucks, boats, golf carts, snowmobiles, heavy machines, or any type of vehicle that uses directional lighting. One or more load devices 108 may include an inductive load. For instance, one or more load devices 108 may include a relay, solenoid, motor, pump, transformer, and the like. In some examples, one or more load devices 108 may include a resistive load. For instance, one or more load devices 108 may include a light emitting diode and/or an array of light emitting diodes. In some examples, one or more load devices 108 may include a capacitive load. For instance, one or more load devices 108 may include a capacitive element or a bank of capacitive elements connected in series or parallel.

Controller 110 may be configured to control driver 114 to activate switch 112. In some examples, controller 110 may be a wireless controller. For instance, controller 110 may be complaint with digital addressable light interface (DALI). Examples of DALI may be found at IEC 60929 and IEC 62386. In some examples, controller 110 may be configured for a dimmable operation. For instance, controller 110 may be configured to output a target current or a target power for operating one or more load devices 108 that defines a light intensity output by one or more load devices 108. In some examples, controller 110 may include an analog circuit. In some examples, controller 110 may be a microcontroller on a single integrated circuit containing a processor core, memory, inputs, and outputs. For example, controller 110 may include one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. In some examples, controller 110 may be a combination of one or more analog components and one or more digital components.

Switch 112 may include any device suitable to generate an electronically conductive channel between primary winding 106A and first ground 118. For example, switch 112 may be activated such that current output from rectifier 104 flows through primary winding 106A and switch 112 to first ground 118. Examples of switch 112 may include, but are not limited to, a silicon controlled rectifier (SCR), a Field Effect Transistor (FET), and a bipolar junction transistor (BJT). Examples of a FET may include, but are not limited to, a junction field-effect transistor (JFET), a metal-oxide-semiconductor FET (MOSFET), a dual-gate MOSFET, insulated-gate bipolar transistor (IGBT), any other type of FET, or any combination of the same. Examples of a MOSFET may include, but are not limited to, PMOS, NMOS, DMOS, or any other type of MOSFET, or any combination of the same. Examples of a BJT may include, but are not limited to, a PNP, a NPN, a heterojunction, or any other type of BJT, or any combination of the same. It should be understood that switch 112 may be a high side switch or low side switch. Additionally, switch 112 may be voltage-controlled and/or current-controlled. Examples of current-controlled switching elements may include, but are not limited to, a gallium nitride (GaN) MOSFET, a BJT, or another current-controlled element.

Driver 114 may be configured to activate switch 112 to energize primary winding 106A. It should be understood that activating switch 112 may refer to instances where a pulse width modulation (PWM) scheme is used. For example, driver 114 may output a PWM signal with a duty cycle for achieving a target current or a target power at one or more load devices 108. For instance, driver 114 may increase a duty cycle of the PWM signal used to activate switch 112 to increase a current and power output at capacitor 122 and one or more load devices 108. Similarly, driver 114 may decrease a duty cycle of the PWM signal used to activate switch 112 to decrease a current and power output at capacitor 122 and one or more load devices 108. In some examples, driver 114 may include an analog circuit. In some examples, driver 114 may include a microcontroller on a single integrated circuit containing a processor core, memory, inputs, and outputs. In some examples, driver 114 may be a combination of one or more analog components and one or more digital components.

Driver 114 may generate a burst PWM signal. For instance, driver 114 may output a PWM signal having a "burst" of 10 cycles (e.g., pulses) with a duty cycle in the range of 1-10% to activate switch 112. In some examples, a burst PWM signal may be configured to activate switch 112 such that a voltage at capacitor 122 remains constant. That is, a burst PWM signal may magnetize a core of transformer such that the core substantially (e.g., more than half) demagnetizes into voltage supply 116 instead of capacitor 122.

Driver 114 may be configured to activate switch 112 based on an estimated output current (e.g., current output at secondary winding 106B). That is, rather than driver 114 directly measuring a current output at secondary winding 106B, driver 114 may use information on the primary side. For example, driver 114 may use a current or power at auxiliary winding 106C to determine an estimated output current at secondary winding 106B. For instance, driver 114 may increase a duty cycle of a PWM signal used to activate switch 112 when a current or power at auxiliary winding 106C is less than a target current or power and may decrease the duty cycle of the PWM signal used to activate switch 112 when a current or power at auxiliary winding 106C is greater than the target current or power. In some examples, driver 114 may use a current or power at primary winding 106A to determine an estimated output current at secondary winding 106B. For instance, driver 114 may increase a duty cycle of a PWM signal used to activate switch 112 when a current or power at primary winding 106A is less than a target current or power and may decrease the duty cycle of the PWM used to activate switch 112 signal when a current or power at primary winding 106A is greater than the target current or power.

Capacitor 122 may include an electrical component configured to store electrical energy in an electric field. Examples of an electrical component configured to store electrical energy in an electric field may include, but are not limited to, ceramic capacitors, film capacitors, electrolytic capacitors, super capacitors, mica capacitors, or other electrical components configured to store energy in an electric field. Examples of electrolytic capacitors may include, but are not limited to, aluminum, tantalum, niobium, or other electrolytic capacitors. Examples of super capacitors, may include, but are not limited to, double layer, pseudocapacitors, hybrid capacitors, or other super capacitors. Although capacitor 122 may be described as a single capacitor, capacitor 122 may be an array of capacitive elements. For instance, capacitor 122 may be an array of capacitive elements coupled in parallel and/or series. In some instances, each capacitive element may be a discrete component, while in other instances, each one of the capacitive elements may be contained within a single package (e.g., capacitor array).

Voltage supply 116 may be configured to provide a voltage to operate devices of system 100. For example, as shown, voltage supply 116 may be configured to provide a voltage to operate controller 110. In another example, voltage supply 116 may be configured to provide a voltage to operate driver 114. In some examples, voltage supply 116 may receive power from a forward or reverse auxiliary winding 106. For instance, voltage supply 116 may receive a first voltage at auxiliary winding 106, convert the first voltage to a second voltage for output to driver 114, and convert the first voltage or second voltage to a third voltage for output to controller 110.

Voltage supply 116 may be configured to receive an electrical current having a constant average current over time from auxiliary winding 106. For example, voltage supply 116 may use a PWM scheme such that an average current over a set of cycles for the PWM scheme is substantially equal. As used herein, average current over a set of cycles for the PWM scheme may be substantially equal when a maximum average current during each cycle of the set of cycles for the PWM scheme is within 10% of an average current of the set of cycles. For instance, voltage supply 116 may receive an electrical current having a constant average current over time from auxiliary winding 106 when voltage supply 116 receives an average of 500 milliamps during a first cycle, 505 milliamps during a second cycle, 510 milliamps during a third cycle, 498 milliamps during a fourth cycle. In contrast, however, voltage supply 116 may receive an electrical current that does not have a constant average current over time from auxiliary winding 106 when voltage supply 116 receives an average of 400 milliamps during a first cycle, 600 milliamps during a second cycle, 300 milliamps during a third cycle, 800 milliamps during a fourth cycle.

Voltage sensor 134 may be configured to provide an indication of a voltage at auxiliary winding 106C. For example, voltage sensor 134 may be a voltage divider that outputs a voltage that is proportional to the voltage at auxiliary winding 106C.

In operation, system 100 includes controller 110, transformer 106, voltage supply 116, and driver 114. Controller 110 is configured to output a target current or a target power for operating one or more load devices 108. Transformer 106 includes primary winding 106A, secondary winding 106B, and auxiliary winding 106C. Voltage supply 116 may be configured to receive a constant current ("$i_{constant}$") from auxiliary winding 106C and output a variable current ("$i_{variable}$") for operating controller 110.

Driver 114 may be configured to selectively energize primary winding 106A for activating one or more load devices 108 based on the target current or the target power and based on an indication of voltage at auxiliary winding 106C. For example, driver 114 may decrease a duty cycle of a PWM signal used to activate switch 112 when the target current is less than an estimated current indicated by voltage sensor 134 and may increase the duty cycle of the PWM signal used to activate switch 112 when the target power is not less than the estimated power indicated by voltage sensor 134. In another example, driver 114 may decrease a duty cycle of a PWM signal used to activate switch 112 when the target current is less than an estimated current calculated based on the primary winding current and the timing of the switching. Driver 114 may increase the duty cycle of the PWM signal used to activate switch 112 when the target current is not less than the estimated current calculated based on the primary winding current and the timing of the switching.

Driver 114 may be further configured to selectively energize primary winding 106A for operating voltage supply 116. For example, driver 114 may activate switch 112 when a voltage output by voltage sensor 134 indicates that a voltage at auxiliary winding 106C is less than a voltage threshold associated with operating controller 110. It should be understood that driver 114 may selectively energize primary winding 106A for operating voltage supply 116 in parallel with selectively energizing primary winding 106A for activating one or more load devices 108. Although FIG. 1 illustrates selectively energizing primary winding 106A for supplying one or more load devices 108 through secondary winding 106B, it should be understood that one or more load devices 108 may be supplied by other windings, for instance, primary winding 108A.

Accordingly, in some techniques, driver 114 may energize primary winding 106A for operating voltage supply 116 at auxiliary winding 106C. That is, driver 114 may control, in parallel with the control of the current or power at load devices 108, a voltage and/or current provided to voltage supply 116. In this way, driver 114 may ensure that controller 110 and/or driver 114 are supplied sufficient power from auxiliary winding 106C, even when one or more load devices 108 are off. Further, voltage supply 116 may be configured to receive a constant current ("$i_{constant}$") from auxiliary winding 106C and output a varying current ("$i_{variable}$") to controller 110 and/or driver 114. In this way, driver 114 may compensate the constant current to the auxiliary winding 106C and may ensure accurate control of a current output at secondary winding 106B to one or more load devices 108, even when voltage supply 116 powers devices that use a variable amount of current.

Figure 2:
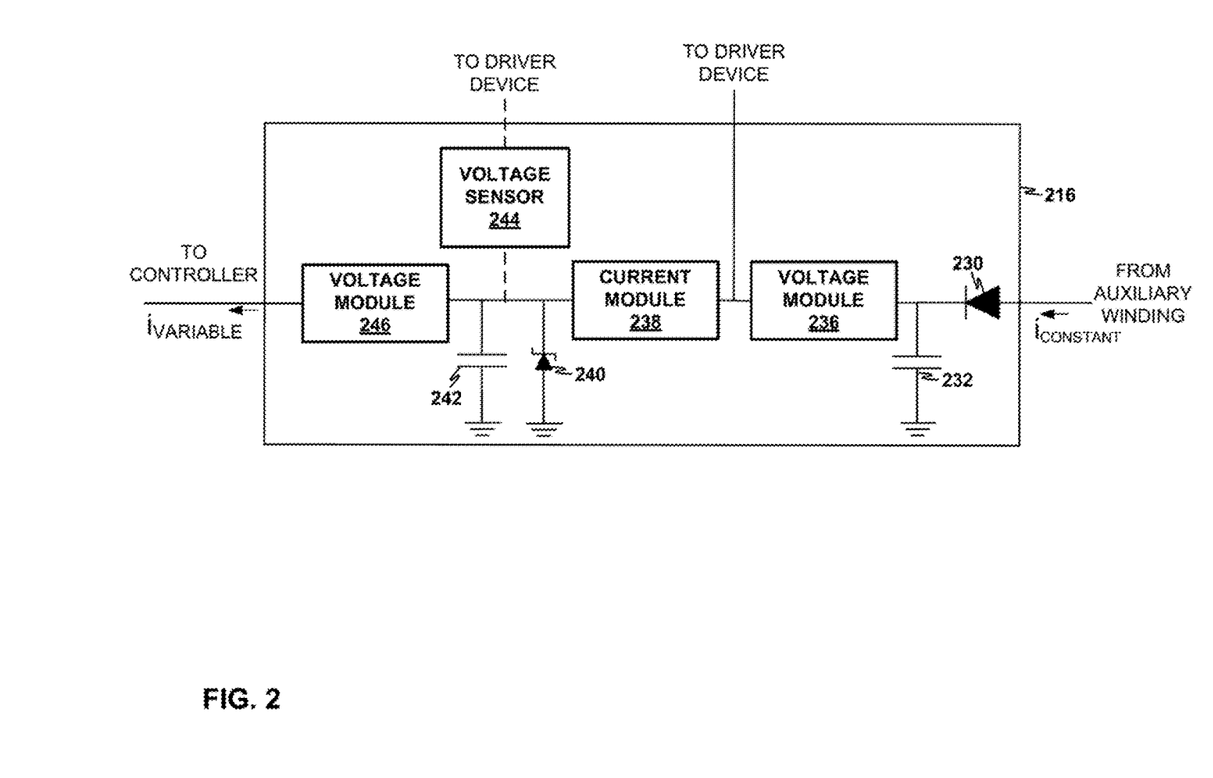
FIG. 2 is a block diagram illustrating an exemplary first voltage supply using an auxiliary winding, in accordance with one or more techniques of this disclosure.

FIG. 2 is a block diagram illustrating an exemplary first voltage supply 216 using an auxiliary winding, in accordance with one or more techniques of this disclosure. As illustrated, voltage supply 216 may include diode 230, capacitor 232, voltage sensor 244, voltage module 236, current module 238, current sink 240, capacitor 242, and voltage module 246. Voltage supply 216 may be an example of voltage supply 116 of FIG. 1. FIG. 2 is discussed with respect to FIG. 1 for exemplary purposes only.

Capacitor 232 may include an electrical component configured to store electrical energy in an electric field. Although capacitor 232 may be described as a single capacitor, capacitor 232 may be an array of capacitive elements. For instance, capacitor 232 may be an array of capacitive elements coupled in parallel and/or series. In some instances, each capacitive element may be a discrete component, while in other instances, each one of the capacitive elements may be contained within a single package (e.g., capacitor array).

Voltage sensor 244 may be configured to provide an indication of a voltage at a capacitor 242. For example, voltage sensor 244 may be a voltage divider that outputs a voltage that is proportional to the voltage at capacitor 242.

Voltage module 236 may be configured to receive a voltage at capacitor 232 and output a voltage. In some examples, voltage module 236 may be a low-dropout (LDO) regulator. In some examples, voltage module 236 may be a switch-mode power converter. Examples of switch-mode power converts include, but are not limited to, flyback, buck-boost, buck, Ćuk, or other switch-mode power converters.

Current module 238 may be configured to provide electrical current into capacitor 242 and into current sink 240 such that a combination of electrical current provided into capacitor 242 and current sink 240 is constant. For example, current module 238 may be a constant current linear regulator. For instance, current module 238 may be a constant current regulator configured to output ~10 milliamps (mA).

Current sink 240 may be configured to consume a variable amount of current based on a current consumed by a voltage module 246. More specifically, current sink 240 may consume a remaining amount of current that is output by current module 238 and not consumed by voltage module 246. As shown, current sink 240 may be a Zener diode.

Current sink 240 may be selected to have a breakdown voltage that is less than a voltage output by voltage module 236 and/or current module 238 such that current sink 240 consumes current when one or more load devices 108 are activated. Additionally, or alternatively, current sink 240 may be selected to have a breakdown voltage that is larger than a voltage output by voltage module 246 such that capacitor 242 may store a sufficient buffer of energy to reduce a frequency of operations (e.g., burst charging) for charging capacitor 242. For instance, in an exemplary application, voltage module 236 and current module 238 may output 15 volts, voltage module 246 may output 3.3 volts, and current sink 240 may have a breakdown voltage of between 7.8 to 7.5 volts. It should be noted that at such a breakdown voltage, Zener diodes are stable across a range of currents (e.g., 1-10 milliamps) suitable for powering controller 110.

Capacitor 242 may include an electrical component configured to store electrical energy in an electric field. Although capacitor 242 may be described as a single capacitor, capacitor 242 may be an array of capacitive elements. For instance, capacitor 242 may be an array of capacitive elements coupled in parallel and/or series.

Voltage module 246 may be configured to receive a voltage at capacitor 242 and output a voltage. In some examples, voltage module 246 may be a low-dropout (LDO) regulator. In some examples, voltage module 246 may be a switch-mode power converter.

Accordingly, in some techniques, rather than drawing a variable amount of electrical current from auxiliary winding 106C, voltage supply 216 may be configured to receive a constant current ("$i_{constant}$") from auxiliary winding 106C and output a varying current ("$i_{variable}$") to controller 110 and/or driver 114. In this way, voltage supply 216 permits driver 114 to compensate the constant current to the auxiliary winding 106C and accurately control of a current output at secondary winding 106B to one or more load devices 108, even when voltage supply 216 powers devices that use a variable amount of current.

Figure 3:
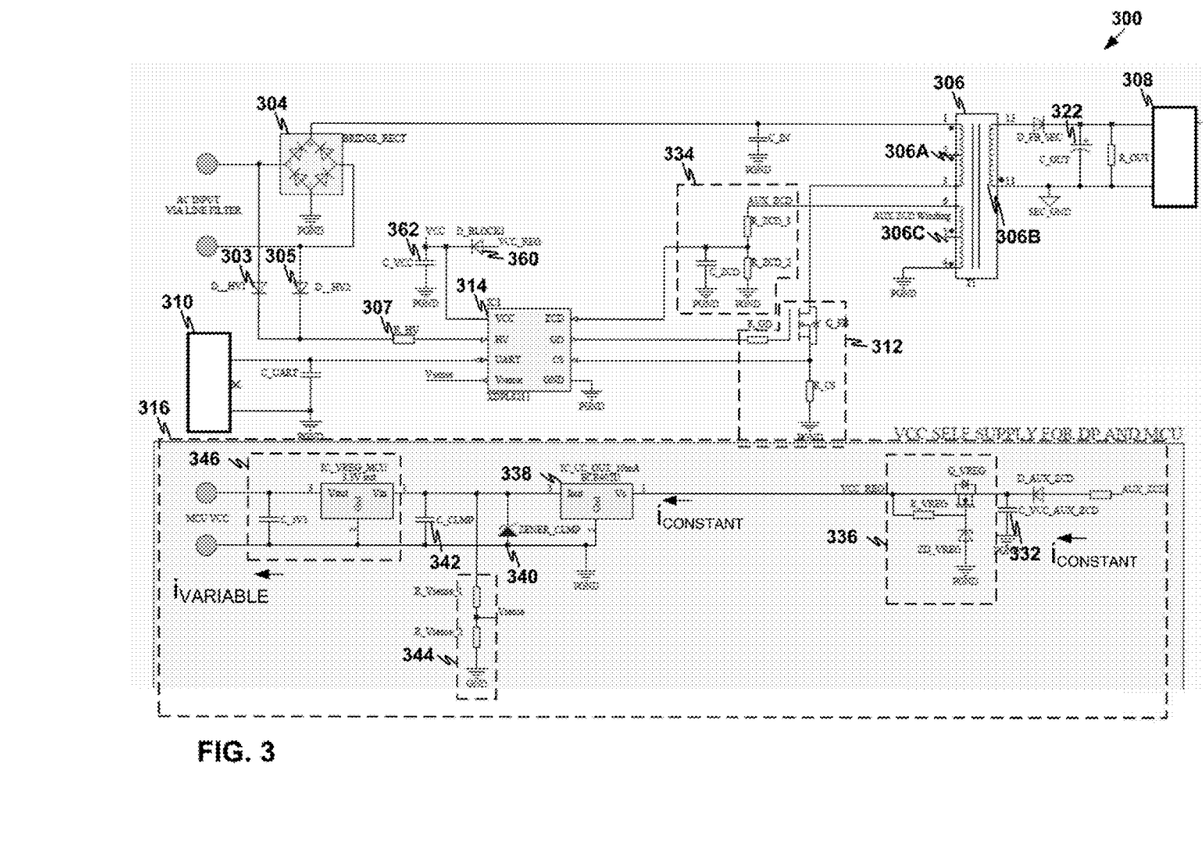
FIG. 3 is a conceptual diagram illustrating an exemplary first circuit for voltage supply using an auxiliary winding, in accordance with one or more techniques of this disclosure.

FIG. 3 is a conceptual diagram illustrating an exemplary first circuit 300 for voltage supply using an auxiliary winding, in accordance with one or more techniques of this disclosure. As illustrated, circuit 300 includes diode 303, rectifier 304, diode 305, primary winding 306A, secondary winding 306B, and auxiliary winding 306C (collectively, transformer 306), resistor 307, one or more loads 308, controller 310, switch 312, driver 314, voltage supply 316, capacitor 322, voltage divider 334, diode 360, and capacitor 362. FIG. 3 is discussed with respect to FIGS. 1-2 for exemplary purposes only. Rectifier 304 may be an example of rectifier 104 of FIG. 1. Transformer 306 may be an example of transformer 106 of FIG. 1. One or more loads 308 may be an example of one or more load devices 108 of FIG. 1. Controller 310 may be an example of controller 110 of FIG. 1. Switch 312 may be an example of switch 112 of FIG. 1. Driver 314 may be an example of driver 114 of FIG. 1. Voltage supply 316 may be an example of voltage supply 116 of FIG. 1. Voltage divider 334 may be an example of voltage sensor 134 of FIG. 1.

Voltage supply 316 may include capacitor 332, LDO 336, linear current regulator 338, Zener diode 340, capacitor 342, voltage divider 344, and LDO 346. Capacitor 332 may be an example of capacitor 232 of FIG. 2. LDO 336 may be an example of voltage module 236 of FIG. 2. Linear current regulator 338 may be an example of current module 238 of FIG. 2. Zener diode 340 may be an example of current sink 240 of FIG. 2. LDO 346 may be an example of voltage module 246 of FIG. 2. Capacitor 342 may be an example of capacitor 242 of FIG. 2. Voltage divider 344 may be an example of voltage sensor 244 of FIG. 2.

Transformer 306 may be selected to have a suitable turns ratio between auxiliary winding 306C to secondary winding 306B. For example, a designer may select transformer 306 such that a turns ratio of auxiliary winding 306C to secondary winding 306B does not reach a minimum turn-on threshold of one or more loads 308 by a certain margin when capacitor 322 is charged up to a voltage level of Vzcd (burst_stop).

Driver 314 may be configured to receive a supply from rectifier 304. For example, rectifier 304 outputs current, via diodes 303 and 305 and resistor 307, to the "HV" pin of driver 314, which driver 314 may use to charge capacitor 362. In this way, driver 314 may startup without receiving a voltage from voltage supply 316. Additionally, or alternatively, driver 314 may be configured to receive a supply from voltage supply 316. More specially, driver 314 and capacitor 362 may receive, via diode 360, current from LDO 336. In this way, driver 314 may receive a voltage from voltage supply 316 after the initial startup.

Driver 314 may receive an indication of a voltage at auxiliary winding 306C from voltage divider 334. For example, voltage divider 334 may receive a voltage output by auxiliary winding 306C and output a voltage that is proportional to the voltage at auxiliary winding 306C. Further, driver 314 may determine a voltage output at secondary winding 306B by accounting for the ratio of windings between secondary winding 306B and auxiliary winding 306B. Additionally, or alternatively, driver 314 may receive an indication of a voltage at capacitor 342. For example, voltage divider 344 may receive a voltage at capacitor 342 and output a voltage that is proportional to the voltage at capacitor 342.

Driver 314 may estimate the current to one or more loads 308 using the primary winding current through switch 312 and timing of the switching of switch 312 and timing of the switching captured using voltage divider 334.

Driver 314 may be configured to selectively energize primary winding 306A for operating voltage supply 316 such that a voltage output at one or more loads 308 is less than a voltage threshold associated with activating one or more loads 308. As used herein, the voltage threshold associated with activating one or more loads 308 may correspond to a minimum voltage to activate one or more loads 308 with an tolerance voltage subtracted. For instance, the voltage threshold associated with activating one or more loads 308 may be defined as about 75% of a voltage that activates one or more loads 308. For example, a designer may define transformer 306 with a winding ratio between secondary winding 306B and auxiliary winding 306C such that a voltage output at one or more loads 308 after activating switch 312 to selectively energize primary winding 306A for operating voltage supply 316 is less than the voltage threshold associated with activating one or more loads 308. In this way, driver 314 may activate switch 312 to selectively energize primary winding 306A for operating voltage supply 316 without inadvertently activating one or more loads 308. Additionally, or alternatively, driver 314 may deactivate switch 312 based on a voltage at voltage supply 316 such that a voltage output at one or more loads 308 after activating switch 312 is less than the voltage threshold associated with activating one or more loads 308.

Driver 314 may be configured to selectively energize primary winding 306A for operating voltage supply 316 based on an indication of the voltage at auxiliary winding 306C. For example, driver 314 may activate switch 312 for energizing primary winding 306A when a voltage output by voltage divider 334 indicates that the voltage at auxiliary winding 306C is less than a voltage threshold associated with operating controller 310. As used herein, when the voltage at auxiliary winding 306C is used, the voltage threshold associated with operating controller 310 may correspond to a minimum voltage at auxiliary winding 306C that may be used by voltage supply 316 to operate controller 310 with an additional tolerance voltage added. For instance, the voltage threshold associated with operating controller 310 may be defined as about 125% of the minimum voltage at auxiliary winding 306C that may be used by voltage supply 316 to operate controller 310. In some examples, the voltage threshold associated with operating controller 310 may be defined as a range. For instance, the voltage threshold associated with operating controller 310 may be defined as a range of about 125% to 150% of the minimum voltage at auxiliary winding 306C that may be used by voltage supply 316 to operate controller 310.

Driver 314 may activate switch 312 for energizing primary winding 306A using a burst PWM signal. For instance, driver 314 may activate switch 312 for energizing primary winding 306A using a burst PWM signal that comprises an envelope of a small number of pulses (e.g., 10 cycles) having a duty cycle of ~1-10%. After outputting the burst PWM signal to activate switch 312, the voltage at auxiliary winding 306C may increase to be greater than the voltage threshold associated with operating controller 310. As such, driver 314 may refrain from activating switch 312 until one or more loads 308 are activated and/or the voltage at auxiliary winding 306C becomes less than the voltage threshold associated with operating controller 310. In this way, driver 314 and/or controller 310 may operate in a sleep mode until one or more loads 308 are activated and/or the voltage at auxiliary winding 306C becomes less than the voltage threshold associated with operating controller 310, thereby reducing a power consumption of circuit 300.

Driver 314 may determine whether to deactivate switch 312 based on an indication of the voltage at auxiliary winding 306C. For example, driver 314 may deactivate switch 312 when a voltage output by voltage divider 334 indicates that the voltage at auxiliary winding 306C is not less than a voltage threshold associated with activating one or more loads 308. As used herein, the voltage threshold associated with activating one or more loads 308 may correspond to a minimum voltage to activate one or more loads 308 with an tolerance voltage subtracted. For instance, the voltage threshold associated with activating one or more loads 308 may be defined as about 75% of a voltage at auxiliary winding 306 that corresponds (e.g., modified by a ratio between secondary winding 306B and auxiliary winding 306C) to a voltage at secondary winding 306B that activates one or more loads 308 (e.g., ~8 volts when one or more loads 308 may be activated at ~12 volts). In some examples, the voltage threshold associated with activating one or more loads 308 may be defined as $V_{burst\_stop}$ (e.g. 8V).

Driver 314 may be configured to selectively energize primary winding 306A for operating voltage supply 316 based on an indication of the voltage at capacitor 342. For example, driver 314 may activate switch 312 for energizing primary winding 306A when a voltage output by voltage divider 344 indicates that the voltage at capacitor 342 is less than a voltage threshold associated with operating controller 310. As used herein, when a voltage at capacitor 342 is used, the voltage threshold associated with operating controller 310 may correspond to a minimum voltage to operate controller 310 with an additional tolerance voltage added. For instance, the voltage threshold associated with operating controller 310 may be defined as about 125% of an operating voltage of controller 310 (e.g., ~4 volts when controller 310 operates at ~3.3 volts). In some examples, the voltage threshold associated with operating controller 310 may be defined as a range. For instance, the voltage threshold associated with operating controller 310 may be defined as a range of about 125% to 150% of the operating voltage of controller 310. In some examples, the voltage threshold associated with operating controller 310 may be defined as $V_{burst\_restart}$ (e.g. 4V).

It should be understood that driver 314 may be configured to selectively energize primary winding 306A for operating voltage supply 316 based on a combination of an indication of the voltage at auxiliary winding 306C and an indication of the voltage at capacitor 342. For example, driver 314 may activate switch 312 for energizing primary winding 306A when a voltage output by voltage divider 344 indicates that the voltage at capacitor 342 is less than a voltage threshold associated with operating controller 310. In this example, driver 314 may determine whether to deactivate the switch based on an indication of the voltage at auxiliary winding 306C. For instance, driver 314 may deactivate switch 312 when a voltage output by voltage divider 334 indicates that the voltage at auxiliary winding 306C is not less than a voltage threshold associated with activating one or more loads 308.

In operation, circuit 300 includes controller 310, transformer 306, voltage supply 316, and driver 314. Controller 310 is configured to output a target current or a target power for operating one or more loads 308. Transformer 306 includes primary winding 306A, secondary winding 306B, and auxiliary winding 306C. Voltage supply 316 may be configured to receive a constant current ("$i_{constant}$") from auxiliary winding 306C and output a variable current ("$i_{variable}$") for operating controller 310.

Driver 314 may be configured to selectively energize primary winding 306A for activating one or more loads 308 based on the target current or the target power and based on an indication of voltage at auxiliary winding 306C. For example, driver 314 may increase a duty cycle of a PWM signal used to activate switch 312 when a target current is greater than a current indicated by an output by voltage divider 334 and may decrease the duty cycle of the PWM signal used to activate switch 312 when the target current is not greater than the current indicated by an output by voltage divider 334. In another example, driver 314 may increase a duty cycle of a PWM signal used to activate switch 312 when the target power is greater than an estimated power calculated based on the primary winding current and the timing of the switching. Driver 314 may decrease the duty cycle of the PWM signal used to activate switch 312 when the target power is not less than the estimated current calculated based on the primary winding current and the timing of the switching.

Driver 314 may be further configured to selectively energize primary winding 306A for operating voltage supply 316. For example, driver 314 may activate switch 312 when a voltage output by voltage divider 344 is less than a voltage threshold associated with operating controller 310.

Accordingly, in some techniques, driver 314 may energize primary winding 306A for operating voltage supply 316 at auxiliary winding 306C. In this way, driver 314 may ensure that controller 310 and/or driver 314 are supplied sufficient power from auxiliary winding 306C, even when one or more loads 308 are off. Further, voltage supply 316 may be configured to receive a constant current ("$i_{constant}$") from auxiliary winding 306C and output a varying current ("$i_{variable}$") to controller 310 and/or driver 314. In this way, driver 314 may compensate the constant current to the auxiliary winding 306C and ensure accurate control of a current output at secondary winding 306B to one or more loads 308, even when voltage supply 316 powers devices that use a variable amount of current.

Figure 4:
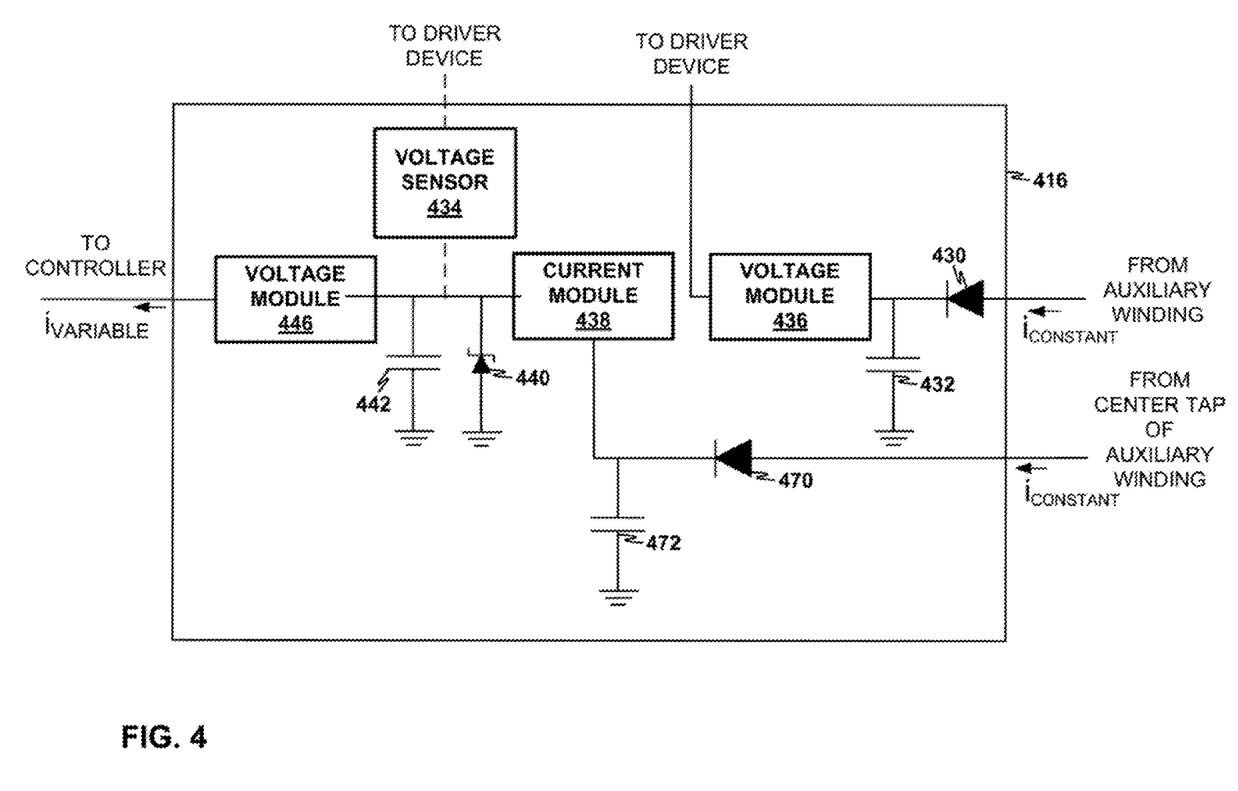
FIG. 4 is a block diagram illustrating an exemplary second voltage supply using an auxiliary winding, in accordance with one or more techniques of this disclosure.

FIG. 4 is a block diagram illustrating an exemplary second voltage supply 416 using an auxiliary winding, in accordance with one or more techniques of this disclosure. As illustrated, voltage supply 416 may include diode 430, capacitor 432, voltage sensor 434, voltage module 436, current module 438, current sink 440, capacitor 442, and voltage module 446. Voltage supply 416 may be an example of voltage supply 116 of FIG. 1. FIG. 2 is discussed with respect to FIGS. 1-3 for exemplary purposes only.

Voltage supply 416 may be substantially similar to voltage supply 216 of FIG. 2 except that current module 438 receives a voltage output at a center tap rather than a voltage output by voltage module 436. Specifically, current module 438 and capacitor 472 receive, via diode 470, a voltage output by a center tap of an auxiliary winding. In this way, voltage module 436 may supply less current than voltage supply 216 because the center tap of the auxiliary winding supplies current to current module 438, thereby improving an efficiency of voltage supply 416.

Figure 5:
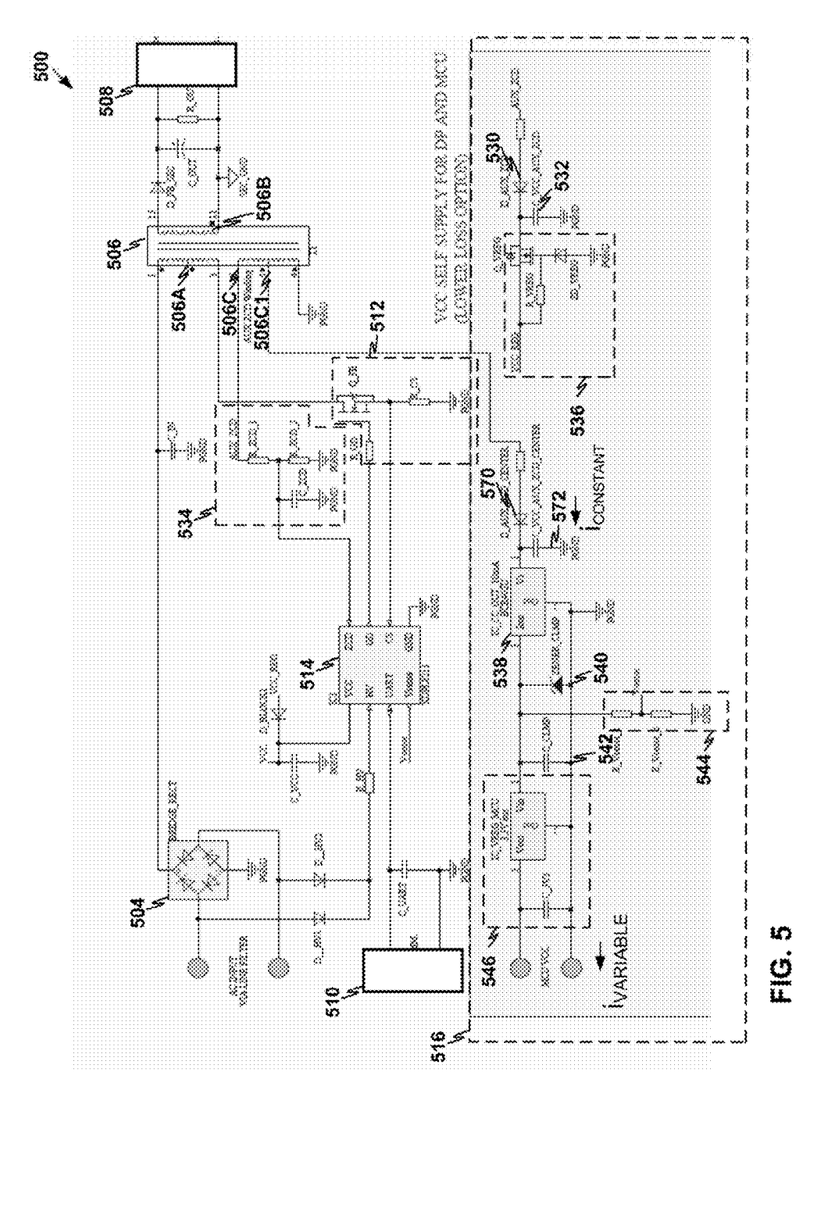
FIG. 5 is a conceptual diagram illustrating an exemplary second circuit for voltage supply using an auxiliary winding, in accordance with one or more techniques of this disclosure.

FIG. 5 is a conceptual diagram illustrating an exemplary second circuit 500 for voltage supply using an auxiliary winding, in accordance with one or more techniques of this disclosure. As illustrated, circuit 500 includes rectifier 504, primary winding 506A, secondary winding 506B, auxiliary winding 506C, and center tap 506C1 of auxiliary winding 506C (collectively, transformer 506), one or more loads 508, controller 510, switch 512, driver 514, voltage supply 516, and voltage divider 534. FIG. 5 is discussed with respect to FIGS. 1-4 for exemplary purposes only. Rectifier 504 may be an example of rectifier 104 of FIG. 1. Transformer 506 may be an example of transformer 106 of FIG. 1. One or more loads 508 may be an example of one or more load devices 108 of FIG. 1. Controller 510 may be an example of controller 110 of FIG. 1. Switch 512 may be an example of switch 112 of FIG. 1. Driver 514 may be an example of driver 114 of FIG. 1. Voltage divider 534 may be an example of voltage sensor 134 of FIG. 1.

Voltage supply 516 may include diode 530, capacitor 532, LDO 536, linear current regulator 538, Zener diode 540, capacitor 542, voltage divider 544, LDO 546, diode 570, and capacitor 572. Capacitor 532 may be an example of capacitor 432 of FIG. 4. LDO 536 may be an example of voltage module 436 of FIG. 4. Linear current regulator 538 may be an example of current module 438 of FIG. 4. Zener diode 540 may be an example of current sink 440 of FIG. 42. LDO 546 may be an example of voltage module 446 of FIG. 4. Capacitor 542 may be an example of capacitor 442 of FIG. 4. Voltage divider 544 may be an example of voltage sensor 444 of FIG. 4.

Voltage supply 516 may be substantially similar to voltage supply 316 of FIG. 3 except that linear current regulator 538 receives a voltage output at center tap 506C1 rather than a voltage output by voltage module 536. Specifically, linear current regulator 538 and capacitor 572 receive, via diode 570, a voltage output by center tap 506C1 of auxiliary winding 506C. In this way, voltage module 536 may supply less current than voltage supply 316 because center tap 506C1 of auxiliary winding 506C supplies current to linear current regulator 538, thereby improving an efficiency of voltage supply 516.

Figure 6:
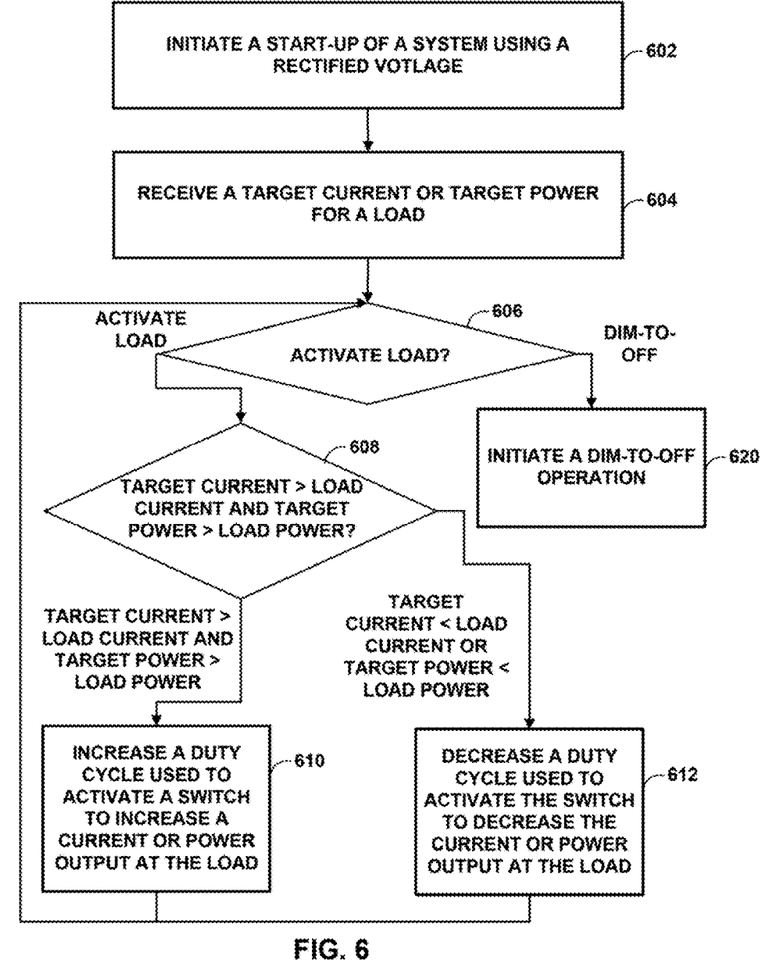
FIG. 6 is a first flow diagram consistent with techniques that may be performed by the system of FIG. 1, in accordance with this disclosure.

FIG. 6 is a first flow diagram consistent with techniques that may be performed by system 100 of FIG. 1, in accordance with this disclosure. For purposes of illustration only, FIG. 6 is described below within the context of system 100 of FIG. 1, voltage supply 216 of FIG. 2, circuit 300 of FIG. 3, voltage supply 416 of FIG. 4, and circuit 500 of FIG. 5. However, the techniques described below can be used in any permutation, and in any combination, with AC source 102, rectifier 104, transformer 106, one or more load devices 108, controller 110, switch 112, driver 114, voltage supply 116, first ground 118, diode 120, capacitor 122, second ground 124, and voltage sensor 134 of FIG. 1.

In accordance with one or more techniques of this disclosure, driver 114 initiates a start-up of system 100 using a rectified voltage (602). For example, when supplied with AC input from rectifier 304 of FIG. 3, a rectified current "HV" flows from diode 303 and diode 305 and resistor 307 to charge up capacitor 362 to a Vcc(on) level suitable to operate driver 314. In this example, diode 360 prevents the charging current being consumed by other devices of circuit 300 or controller 310. Upon startup of driver 314, switch 312 activates (e.g., starts a PWM switching) to charge up capacitor 332 via auxiliary winding 306C.

Driver 114 receives a target current or a target power for a load (604). Driver 114 determines whether to activate an load (606). For example, in response to receiving a target current or a target power setting greater than zero ("Activate load" of 606), driver 314 determines whether the target current is greater than a current output or whether the target power is greater than a power output at one or more loads 308 (608). In response to determining that the target current is greater than the current output and that the target power is greater than a power output at one or more loads 308 ("TARGET CURRENT>LOAD CURRENT AND TARGET POWER>LOAD POWER" of 608), driver 314 increases a duty cycle of a PWM signal used to activate switch 312 to increase a current output and power output at one or more loads 308 (610). For example, driver 314 increase the duty cycle of a PWM signal used to activate switch 312 to charge capacitor 322 to match a current corresponding to the target current. In response, however, to determining that the current voltage is not greater than the current output or that the target power is not greater than a power output at one or more LEDs loads ("TARGET CURRENT<LOAD CURRENT OR TARGET POWER<LOAD POWER" of 608), driver 314 decreases the duty cycle of the PWM signal used to activate switch 312 to decrease the current output and power output at one or more loads 308 (612). For example, driver 314 decreases the duty cycle of the PWM signal used to activate switch 312 once capacitor 322 reaches a current corresponding to the target current and/or a current corresponding to the target power. In response, however, to receiving an instruction for a DIM-TO-OFF operation, ("DIM-TO-OFF" of 606), driver 114 initiates a dim-to-off operation (620).

Figure 7:
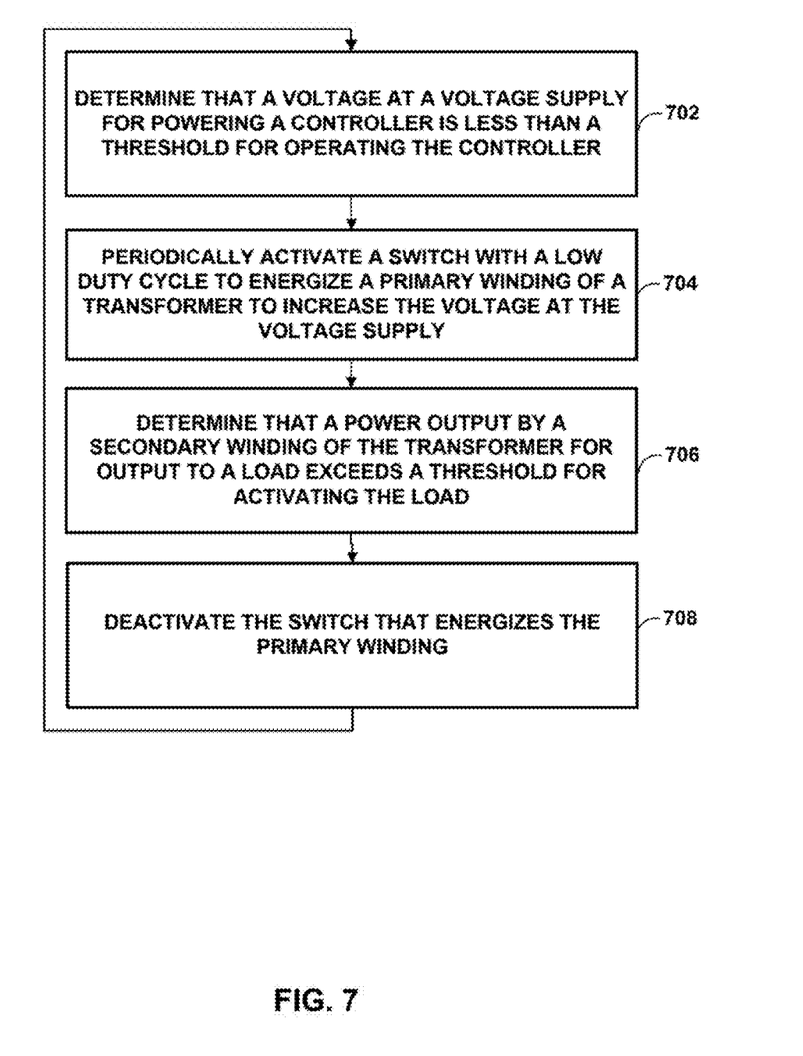
FIG. 7 is a second flow diagram consistent with techniques that may be performed by the system of FIG. 1, in accordance with this disclosure.

FIG. 7 is a second flow diagram consistent with techniques that may be performed by system 100 of FIG. 1, in accordance with this disclosure. For purposes of illustration only, FIG. 7 is described below within the context of system 100 of FIG. 1, voltage supply 216 of FIG. 2, circuit 300 of FIG. 3, voltage supply 416 of FIG. 4, and circuit 500 of FIG. 5. However, the techniques described below can be used in any permutation, and in any combination, with AC source 102, rectifier 104, transformer 106, one or more load devices 108, controller 110, switch 112, driver 114, voltage supply 116, first ground 118, diode 120, capacitor 122, second ground 124, and voltage sensor 134 of FIG. 1. In some examples, one or more techniques described for FIG. 7 may be in response to initiating the dim-to-off operation (620) of FIG. 6.

In accordance with one or more techniques of this disclosure, driver 114 determines that a voltage at a voltage supply for powering a controller is less than a threshold for operating the controller (702). For example, upon startup of driver 314, driver 314 determines that an indication of a voltage output by voltage divider 334 is less than the threshold for operating controller 310. In some examples, driver 314 determines that an indication of a voltage output by voltage divider 344 is less than the threshold for operating controller 310.

Driver 114 periodically activates a switch with a low duty cycle to energize a primary winding of a transformer to increase the voltage at the voltage supply (704). For example, upon the "Vsense" pin of driver 314 detecting an indication, from voltage divider 344, that a voltage at capacitor 342 voltage drops to a $V_{burst\_restart}$ (e.g. 4V) switch 312 will start switching to primarily charge capacitor 332 and capacitor 342 via auxiliary winding 306C but not capacitor 322 via secondary winding 306B. It should be understood that this is because capacitor 332 is substantially drained (e.g., more than 50%) by supplying controller 310 current, as compared to capacitor 322, which only has a weak passive bleeder resistor for discharge while one or more loads 308 are deactivated.

Driver 114 determines that a voltage output by a secondary winding of the transformer for output to a load exceeds a threshold for activating the load (706). For example, driver 314 determines that an indication of a voltage output by voltage divider 334 is greater than the threshold for activating one or more loads 308. In response to determining that the current or power output by the secondary winding of the transformer for output to the load exceeds the threshold for activating the load, driver 114 deactivates switch 312 that energizes the primary winding (708), and returns to 702. For example, driver 314 deactivates switch 312 once capacitor 322 reaches a level of $Vzcd_{(burst\_stop)}$ setting based on a voltage received at pin "ZCD" from voltage divider 334. In this way, driver 314 may (burst) charge capacitor 332 to a level of $Vzcd_{(burst\_stop)}$ based on a voltage output by voltage divider 344. It should be understood that driver 314 may enter sleep mode with its own voltage being supplied via the pin "HV" upon reaching the level of $Vzcd_{(burst\_stop)}$ and before a voltage output by voltage divider 344 ("$V_{sense}$") reaches $V_{burst\_restart}$, for lower standby power loss.

Figure 8:
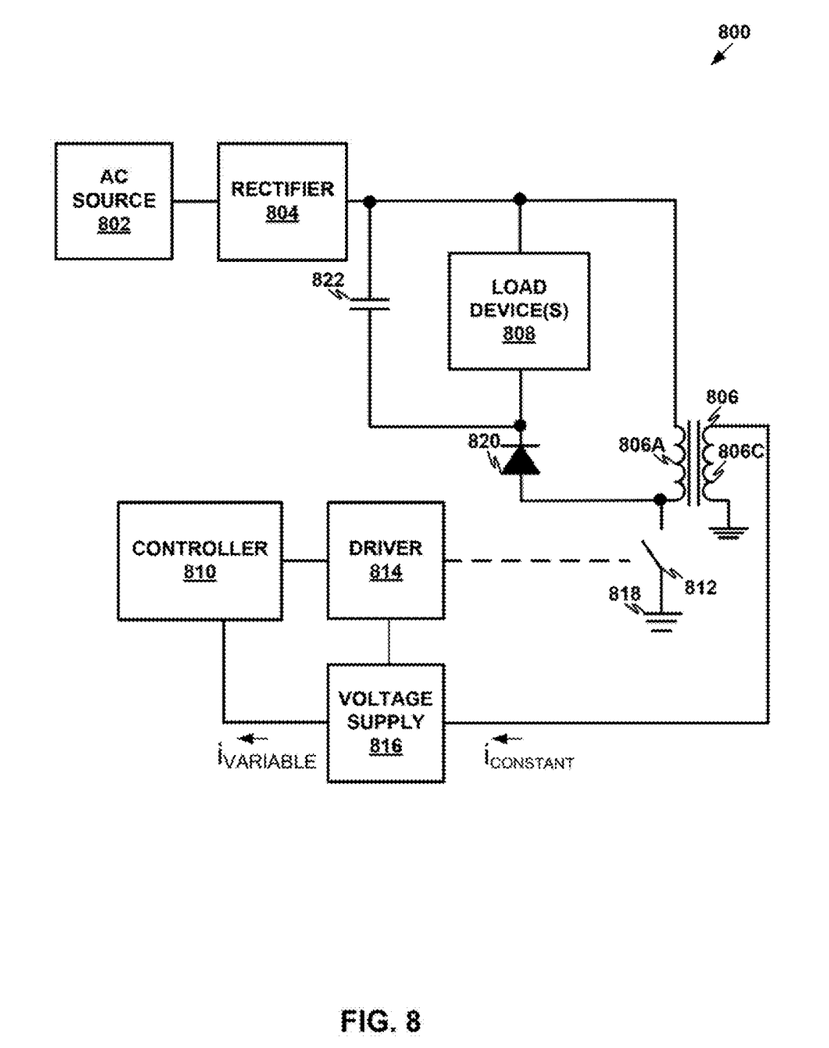
FIG. 8 is a block diagram illustrating an exemplary system for a non-isolated voltage supply, in accordance with one or more techniques of this disclosure.

FIG. 8 is a block diagram illustrating an exemplary system 800 for non-isolated voltage supply, in accordance with one or more techniques of this disclosure. As illustrated, system 800 may include AC source 802, rectifier 804, primary winding 806A and auxiliary winding 806C (collectively, transformer 806), one or more load devices 808, controller 810, switch 812, driver 814, voltage supply 816, ground 818, diode 820, and capacitor 822, which may each correspond to similar components of FIG. 1.

System 800 may be substantially similar to system 100 except that system 800 is arranged for non-isolated operation. For example, one or more load devices 808 are electronically connected to primary winding 806A instead of a secondary winding. As shown, system 800 may be a non-isolated buck-boost converter. For instance, driver 814 may selectively energize primary winding 806A for supplying one or more load devices 808 through primary winding 806A.

The following examples may illustrate one or more aspects of the disclosure.

Example 1

A system comprising: a transformer comprising at least a primary winding and an auxiliary winding; a controller configured to output an indication of a target current or a target power to a driver; a voltage supply being configured to receive an electrical current having a constant average current over time from the auxiliary winding and to output variable electrical current for supplying the controller, the voltage supply having a capacitor for storing energy and a current sink for consuming a current; and the driver configured to: selectively energize the primary winding for supplying one or more load devices based on the target current or the target power; and selectively energize the primary winding for operating the voltage supply based on an indication of a voltage at the voltage supply.

Example 2

The system of example 1, wherein the transformer further comprises a secondary winding and wherein to selectively energize the primary winding for supplying the one or more load devices, the driver is configured to selectively energize the primary winding for supplying the one or more load devices through the secondary winding.

Example 3

The system of any combination of examples 1-2, wherein to selectively energize the primary winding for supplying the one or more load devices, the driver is configured to selectively energize the primary winding for supplying the one or more load devices through the primary winding.

Example 4

The system of any combination of examples 1-3, wherein the driver is further configured to: selectively energize the primary winding for operating the voltage supply based on an indication of the voltage at the auxiliary winding.

Example 5

The system of any combination of examples 1-4, wherein to selectively energize the primary winding for operating the voltage supply, the driver is configured to: activate a switch for energizing the primary winding when the indication of the voltage at the auxiliary winding indicates that the voltage at the auxiliary winding is less than a voltage threshold associated with operating the controller.

Example 6

The system of any combination of examples 1-5, wherein to selectively energize the primary winding for operating the voltage supply, the driver is configured to: deactivate the switch when the indication of the voltage at the auxiliary winding indicates that the voltage at the auxiliary winding is not less than a voltage threshold associated with activating the one or more load devices.

Example 7

The system of any combination of examples 1-6, the driver being further configured to: selectively energize the primary winding for operating the voltage supply based on an indication of the voltage at the capacitor.

Example 8

The system of any combination of examples 1-7, wherein to selectively energize the primary winding for operating the voltage supply based on the indication of the voltage at the capacitor, the driver is configured to: activate a switch for energizing the primary winding to charge the capacitor when the indication of the voltage at the capacitor indicates that the voltage at the auxiliary winding is less than a voltage threshold associated with operating the controller.

Example 9

The system of any combination of examples 1-8, wherein to selectively energize the primary winding for operating the voltage supply based on the indication of the voltage at the capacitor, the driver is configured to: deactivate the switch when the indication of the voltage at the auxiliary winding indicates that the voltage at the auxiliary winding is not less than a voltage threshold associated with activating the one or more load devices.

Example 10

The system of any combination of examples 1-9, wherein the voltage supply further comprises a voltage module configured to output variable electrical current for operating the controller using energy stored at the capacitor.

Example 11

The system of any combination of examples 1-10, wherein the voltage supply further comprises a voltage module configured to output a voltage for operating the driver.

Example 12

The system of any combination of examples 1-11, wherein the voltage supply is configured to receive the electrical current having the constant average current over time from a center tap of the auxiliary winding.

Example 13

The system of any combination of examples 1-12, wherein the one or more load devices comprise one or more dimmable light emitting diodes and wherein the indication of the target current or the target power indicates a dim level for the one or more dimmable light emitting diodes.

Example 14

A driver configured to: receive, from a controller, an indication of a target current or a target power; selectively energize a primary winding of a transformer for supplying one or more load devices based on the target current or the target power; and selectively energize the primary winding for operating a voltage supply based on an indication of a voltage at the voltage supply, wherein the voltage supply is configured to receive an electrical current having a constant average current over time from an auxiliary winding of the transformer and to output variable electrical current for supplying the controller and wherein the voltage supply includes a capacitor for storing energy and a current sink for consuming a current.

Example 15

The driver of example 14, wherein the indication of the voltage at the voltage supply is an indication of a voltage at the auxiliary winding, the driver being further configured to: selectively energize the primary winding for operating the voltage supply based on the indication of the voltage at the auxiliary winding.

Example 16

The driver of any combination of examples 14-15, wherein to selectively energize the primary winding for operating the voltage supply based on the indication of the voltage at the auxiliary winding, the driver is configured to: activate a switch for energizing the primary winding when the indication of the voltage at the auxiliary winding indicates that the voltage at the auxiliary winding is less than the voltage threshold associated with operating the controller.

Example 17

The driver of any combination of examples 14-16, wherein the indication of the voltage at the voltage supply is an indication of a voltage at the capacitor, the driver being further configured to: selectively energize the primary winding for operating the voltage supply based on the indication of the voltage at the capacitor.

Example 18

The driver of any combination of examples 14-17, wherein to selectively energize the primary winding for operating the voltage supply based on the indication of the voltage at the capacitor, the driver is configured to: activate a switch for energizing the primary winding to charge the capacitor when the indication of the voltage at the capacitor indicates that the voltage at the capacitor is less than the voltage threshold associated with operating the controller.

Example 19

A system comprising: a transformer comprising at least a primary winding and an auxiliary winding; a switch that when activated establishes a conductive path connecting a rectified voltage and the primary winding of the transformer; a controller configured to output an indication of a target current or a target power for one or more load devices; a voltage supply being configured to receive an electrical current having a constant average current over time from the auxiliary winding and to output variable electrical current for supplying the controller, the voltage supply comprising a capacitor for storing energy and a current sink for consuming a current; and a driver configured to selectively activate the switch to energize the primary winding for supplying the one or more load devices; and selectively activate the switch to energize the primary winding for operating the voltage supply based on an indication of a voltage at the voltage supply.

Example 20

The system of example 18, wherein the controller is a wireless controller, the system further comprising: the one or more load devices, wherein the one or more load devices comprise one or more dimmable light emitting diodes and wherein the indication of the target current or the target power indicates a dim level for the one or more dimmable light emitting diodes.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various aspects have been described in this disclosure. These and other aspects are within the scope of the following claims.

The invention claimed is:

1. A system comprising:
    a transformer comprising at least a primary winding and an auxiliary winding;
    a controller configured to output an indication of a target current or a target power to a driver;
    a voltage supply being configured to receive an electrical current having a constant average current over time from the auxiliary winding and to output variable electrical current for supplying the controller, the voltage supply having a capacitor for storing energy, a current sink for consuming a current, and a voltage module, wherein the capacitor and the current sink are coupled to an input of the voltage module and wherein an output of the voltage module outputs the variable electrical current at a regulated voltage to the controller; and
    the driver configured to:
        selectively energize the primary winding for supplying one or more load devices based on the target current or the target power; and
        selectively energize the primary winding for operating the voltage supply based on an indication of a voltage at the voltage supply.

2. The system of claim 1, wherein the transformer further comprises a secondary winding and wherein to selectively energize the primary winding for supplying the one or more load devices, the driver is configured to selectively energize the primary winding for supplying the one or more load devices through the secondary winding.

3. The system of claim 1, wherein to selectively energize the primary winding for supplying the one or more load devices, the driver is configured to selectively energize the primary winding for supplying the one or more load devices through the primary winding.

4. The system of claim 1, wherein the driver is further configured to:
    selectively energize the primary winding for operating the voltage supply based on an indication of the voltage at the auxiliary winding.

5. The system of claim 4, wherein to selectively energize the primary winding for operating the voltage supply, the driver is configured to:
    activate a switch for energizing the primary winding when the indication of the voltage at the auxiliary winding indicates that the voltage at the auxiliary winding is less than a voltage threshold associated with operating the controller.

6. The system of claim 5, wherein to selectively energize the primary winding for operating the voltage supply, the driver is configured to:
    deactivate the switch when the indication of the voltage at the auxiliary winding indicates that the voltage at the auxiliary winding is not less than a voltage threshold associated with activating the one or more load devices.

7. The system of claim 1, the driver being further configured to:
    selectively energize the primary winding for operating the voltage supply based on an indication of the voltage at the capacitor.

8. The system of claim 7, wherein to selectively energize the primary winding for operating the voltage supply based on the indication of the voltage at the capacitor, the driver is configured to:
    activate a switch for energizing the primary winding to charge the capacitor when the indication of the voltage at the capacitor indicates that the voltage at the auxiliary winding is less than a voltage threshold associated with operating the controller.

9. The system of claim 8, wherein to selectively energize the primary winding for operating the voltage supply based on the indication of the voltage at the capacitor, the driver is configured to:
    deactivate the switch when the indication of the voltage at the auxiliary winding indicates that the voltage at the auxiliary winding is not less than a voltage threshold associated with activating the one or more load devices.

10. The system of claim 1, wherein the voltage module is configured to output the variable electrical current using energy stored at the capacitor.

11. The system of claim 1, wherein the voltage module is a first module and wherein the voltage supply further comprises a second voltage module configured to output a voltage for operating the driver.

12. The system of claim 1, wherein the voltage supply is configured to receive the electrical current having the constant average current over time from a center tap of the auxiliary winding.

13. The system of claim 1, wherein the one or more load devices comprise one or more dimmable light emitting diodes and wherein the indication of the target current or the target power indicates a dim level for the one or more dimmable light emitting diodes.

14. A driver configured to:
receive, from a controller, an indication of a target current or a target power;
selectively energize a primary winding of a transformer for supplying one or more load devices based on the target current or the target power; and
selectively energize the primary winding for operating a voltage supply based on an indication of a voltage at the voltage supply,
wherein the voltage supply is configured to receive an electrical current having a constant average current over time from an auxiliary winding of the transformer and to output variable electrical current for supplying the controller, wherein the voltage supply includes a capacitor for storing energy, a current sink for consuming a current, and a voltage module, wherein the capacitor and the current sink are coupled to an input of the voltage module, and wherein an output of the voltage module outputs the variable electrical current at a regulated voltage to the controller.

15. The driver of claim 14, wherein the indication of the voltage at the voltage supply is an indication of a voltage at the auxiliary winding, the driver being further configured to:
selectively energize the primary winding for operating the voltage supply based on the indication of the voltage at the auxiliary winding.

16. The driver of claim 15, wherein to selectively energize the primary winding for operating the voltage supply based on the indication of the voltage at the auxiliary winding, the driver is configured to:
activate a switch for energizing the primary winding when the indication of the voltage at the auxiliary winding indicates that the voltage at the auxiliary winding is less than the voltage threshold associated with operating the controller.

17. The driver of claim 14, wherein the indication of the voltage at the voltage supply is an indication of a voltage at the capacitor, the driver being further configured to:
selectively energize the primary winding for operating the voltage supply based on the indication of the voltage at the capacitor.

18. The driver of claim 17, wherein to selectively energize the primary winding for operating the voltage supply based on the indication of the voltage at the capacitor, the driver is configured to:
activate a switch for energizing the primary winding to charge the capacitor when the indication of the voltage at the capacitor indicates that the voltage at the capacitor is less than the voltage threshold associated with operating the controller.

19. A system comprising:
a transformer comprising at least a primary winding and an auxiliary winding;
a switch that when activated establishes a conductive path connecting a rectified voltage and the primary winding of the transformer;
a controller configured to output an indication of a target current or a target power for one or more load devices;
a voltage supply being configured to receive an electrical current having a constant average current over time from the auxiliary winding and to output variable electrical current for supplying the controller, the voltage supply comprising a capacitor for storing energy, a current sink for consuming a current, and a voltage module, wherein the capacitor and the current sink are coupled to an input of the voltage module and wherein an output of the voltage module outputs the variable electrical current at a regulated voltage to the controller; and
a driver configured to
selectively activate the switch to energize the primary winding for supplying the one or more load devices; and
selectively activate the switch to energize the primary winding for operating the voltage supply based on an indication of a voltage at the voltage supply.

20. The system of claim 19, wherein the controller is a wireless controller, the system further comprising:
the one or more load devices, wherein the one or more load devices comprise one or more dimmable light emitting diodes and wherein the indication of the target current or the target power indicates a dim level for the one or more dimmable light emitting diodes.

* * * * *